US012680619B2

(12) United States Patent
Wu

(10) Patent No.: US 12,680,619 B2
(45) Date of Patent: Jul. 14, 2026

(54) RADIATOR CAP

(71) Applicant: COPLUS INC., Tainan City (TW)

(72) Inventor: Po-Hua Wu, Tainan City (TW)

(73) Assignee: Coplus Inc., Tainan City (TW)

( * ) Notice: Subject to any disclaimer, the term of this patent is extended or adjusted under 35 U.S.C. 154(b) by 108 days.

(21) Appl. No.: 18/788,692

(22) Filed: Jul. 30, 2024

(65) Prior Publication Data

US 2025/0361944 A1 Nov. 27, 2025

(30) Foreign Application Priority Data

May 27, 2024 (TW) ................................. 113119559

(51) Int. Cl.
F16K 17/196 (2006.01)
(52) U.S. Cl.
CPC .................................. F16K 17/196 (2013.01)
(58) Field of Classification Search
CPC . F16K 17/196; F01P 11/0214; F01P 11/0247; F01P 11/0238; F01P 11/0209; B60K 15/0406; F17C 13/06; Y10S 220/32
USPC .......................................... 220/303, DIG. 32
See application file for complete search history.

(56) References Cited

U.S. PATENT DOCUMENTS

| | | | | |
|---|---|---|---|---|
| 3,164,288 A | * | 1/1965 | Boomgaard ......... | F01P 11/0247 |
| | | | | 220/203.24 |
| 4,185,751 A | * | 1/1980 | Moore ................. | F01P 11/0238 |
| | | | | 220/203.26 |
| 4,196,822 A | * | 4/1980 | Avrea ................... | F01P 11/0238 |
| | | | | 220/203.26 |
| 2003/0185276 A1 | * | 10/2003 | Reutter ................ | F01P 11/0247 |
| | | | | 374/146 |
| 2004/0011788 A1 | * | 1/2004 | Harris .................. | F01P 11/0247 |
| | | | | 220/203.26 |

* cited by examiner

*Primary Examiner* — Laura E. Parker
(74) *Attorney, Agent, or Firm* — Burris Law, PLLC

(57) ABSTRACT

A radiator cap includes a top cover unit, an intermediate seat unit, an output valve unit, and an input valve unit. The top cover unit includes cover body, a stem, and a plurality of positioning member to be fastened to a radiator opening. A washer surrounds the stem. The intermediate seat unit includes a connecting tube and a connecting seat connected to each other. The output valve unit includes a valve seat connected to the connecting seat. The valve seat has hook portions engaged with guiding recesses of the connecting seat. A valve disc is connected to the valve seat. A first spring is disposed between the valve seat and the connecting seat. The input valve unit includes a pin rod, and a second spring to bias the pin rod to thereby abut against the valve disc so as to close a valve hole.

8 Claims, 5 Drawing Sheets

RADIATOR CAP

CROSS-REFERENCE TO RELATED APPLICATION

This application claims priority to Taiwanese Invention patent application No. 113119559, filed on May 27, 2024, the entire disclosure of which is incorporated by reference herein.

FIELD

The disclosure relates to a cap, and more particularly to a radiator cap adapted to be mounted to a radiator opening of an automobile.

BACKGROUND

An existing radiator cap is adapted to be mounted to a main radiator of an automobile. The main radiator has a radiator opening formed in a top thereof. The existing radiator cap includes an upper cover, a valve seat, a first spring, a pin rod, and a second spring. The upper cover is fastened to the radiator opening. The valve seat is disposed under the upper cover and closes the radiator opening. The first spring is connected between the upper cover and the valve seat. The pin rod extends through the valve seat. The second spring is connected between the valve seat and the pin rod.

In use, when temperatures in the main radiator are raised, liquids in the main radiator are pressurized to push the valve seat and flow to an auxiliary radiator. Meanwhile, the first spring is caused to generate a spring force. When the liquids are depressurized, the spring force of the first spring restores the valve seat. When a negative pressure is formed in the main radiator to attract and pull the pin rod, the liquids in the auxiliary radiator flow to the main radiator, and the second spring generates a spring force. As long as an attraction force applied on the pin rod is smaller than the spring force of the second spring, the spring force of the second spring restores the pin rod.

When the existing radiator cap unstably closes the radiator opening, leakage or spillover of the liquids may occur, which adversely affects driving safety of the automobile. Because the valve seat and the upper cover are connected to each other only by the first spring, the valve seat may be unrestrainedly movable relative to the upper cover. As a result, during installation or operation of the existing radiator cap, the valve seat may be easily skewed and thus inaccurately close the radiator opening, thereby resulting in an unsatisfactory sealing effect. In addition, the upper cover is made of a metal material; because surface treatment for the upper cover has to be performed, environmental pollution may be easily caused. There is room for improvement of the radiator cap.

SUMMARY

Therefore, an object of the disclosure is to provide a radiator cap that can alleviate at least one of the drawbacks of the prior art.

According to the disclosure, a radiator cap is adapted to be mounted to a radiator opening and has an axis. The radiator cap includes a top cover unit, an intermediate seat unit, an output valve unit, and an input valve unit.

The top cover unit includes a cover body, a stem, two positioning members, and a washer. The cover body is adapted to rotatably cover the radiator opening. The stem extends downwardly from the cover body along the axis. The positioning members are disposed respectively at opposite sides of the axis, protrude inwardly from a periphery of the cover body toward the axis, and are adapted to be fastened to the radiator opening. The washer is disposed in the cover body and surrounds the stem.

The intermediate seat unit is disposed under and connected to the top cover unit, and includes a connecting tube and a connecting seat. The connecting tube is coupled to the stem and extends along the axis. The connecting seat is connected to a lower end of the connecting tube, surrounds the axis, and has a plurality of guiding recesses equiangularly spaced apart from each other with respect to the axis.

The output valve unit is connected to a lower part of the intermediate seat unit, and includes a valve seat, a valve disc, and a first spring. The valve seat is connected to a lower part of the connecting seat and is movable along the axis relative to the connecting seat. The valve seat and the connecting seat cooperatively define an inner space. The valve seat has a plurality of hook portions and a valve hole. The hook portions are respectively engaged with and movable along the guiding recesses. The valve hole is formed in a lower portion of the valve seat and is in fluid communication with the inner space. The valve disc is disposed under and connected to the valve seat. The first spring is disposed within the inner space for resiliently biasing the valve seat away from the top cover unit.

The input valve unit is connected to the output valve unit, is movable along the axis relative to the output valve unit, and includes a pin rod and a second spring. The pin rod extends movably into the inner space via the valve hole. The second spring is mounted between the valve seat and a top portion of the pin rod, and is disposed for resiliently biasing a bottom portion of the pin rod to thereby abut against the valve disc so as to close the valve hole.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
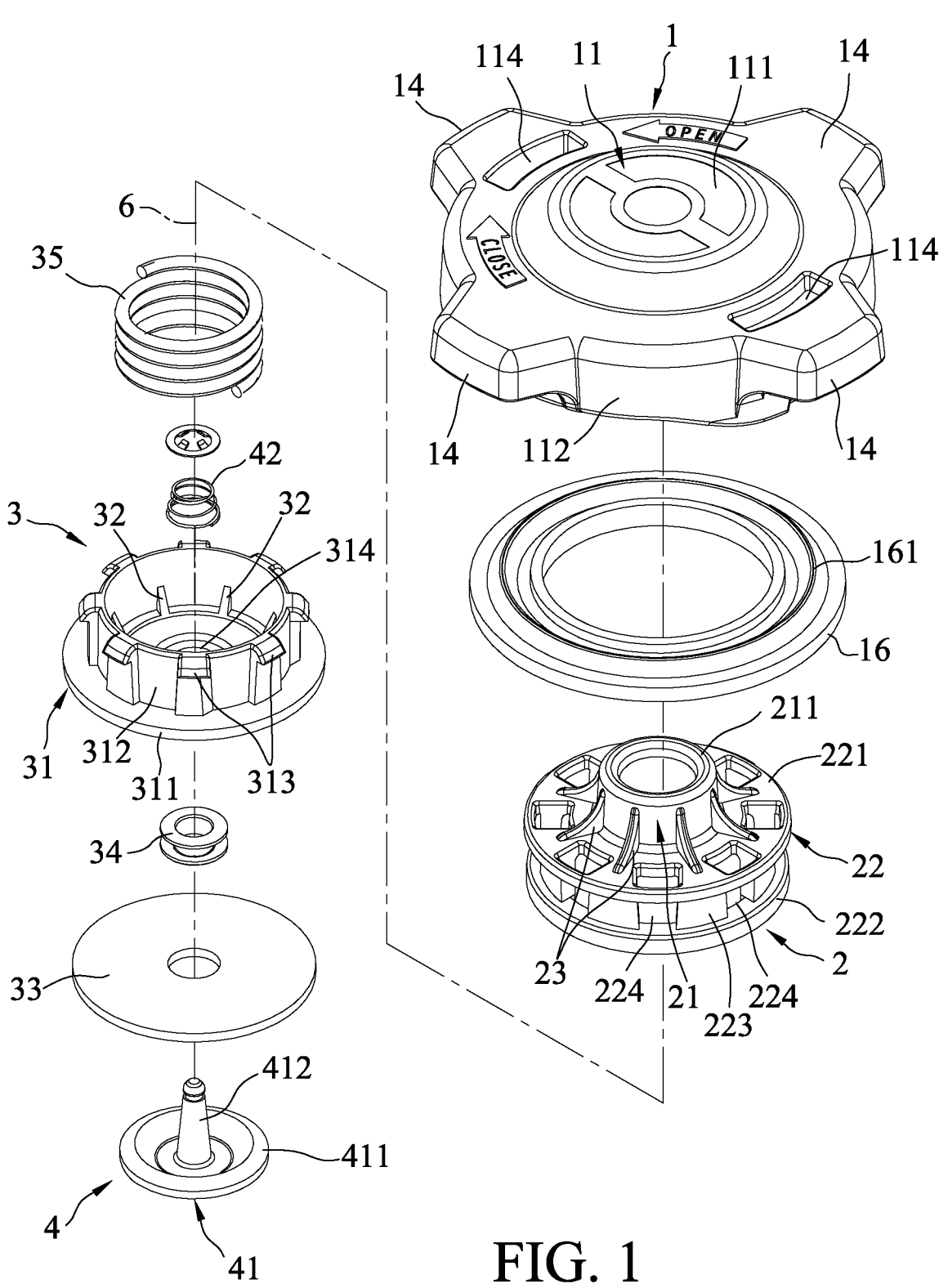
FIG. 1 is a top exploded perspective view illustrating an embodiment of a radiator cap according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
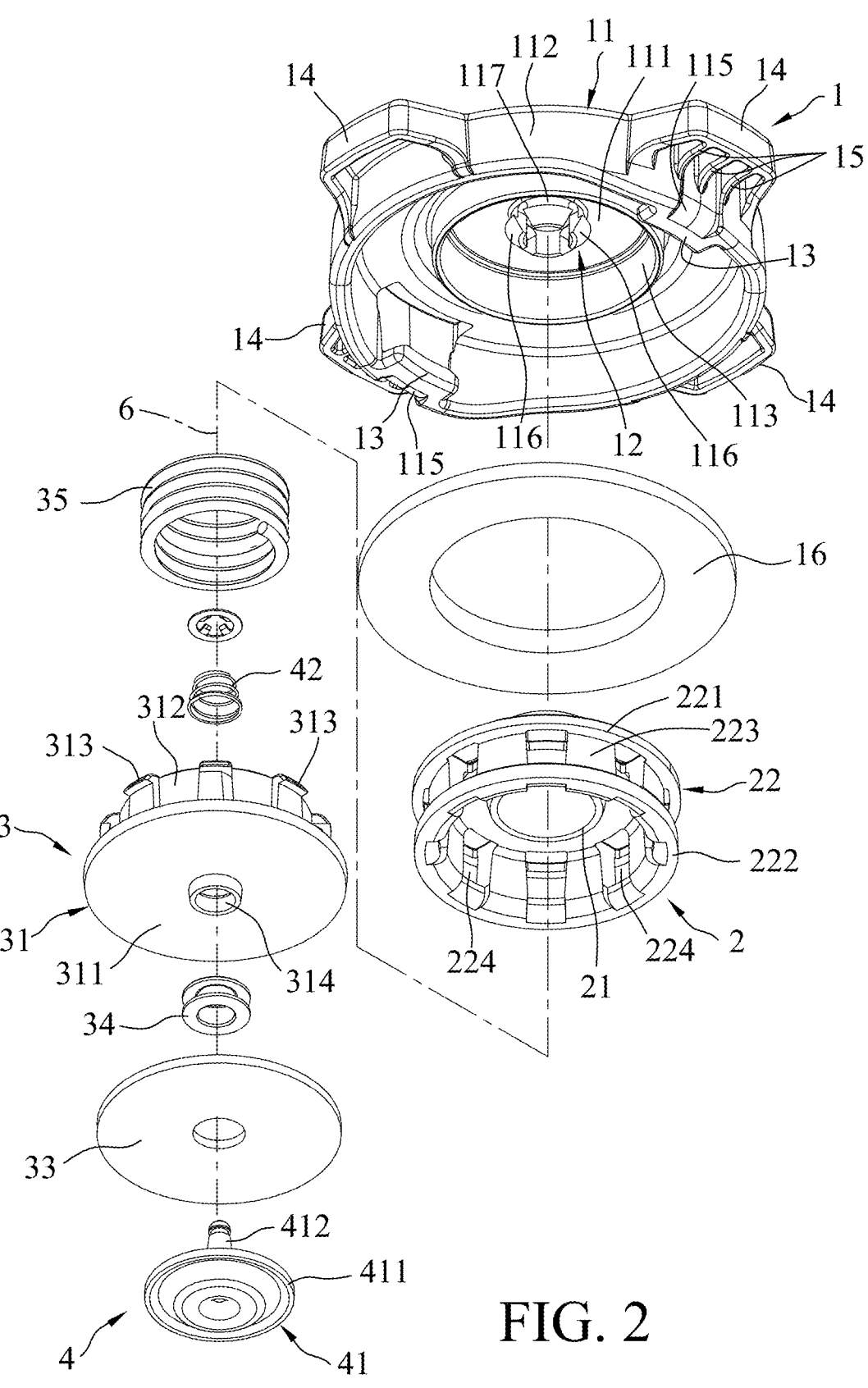
FIG. 2 is a bottom exploded perspective view of the embodiment.
Figure 3:
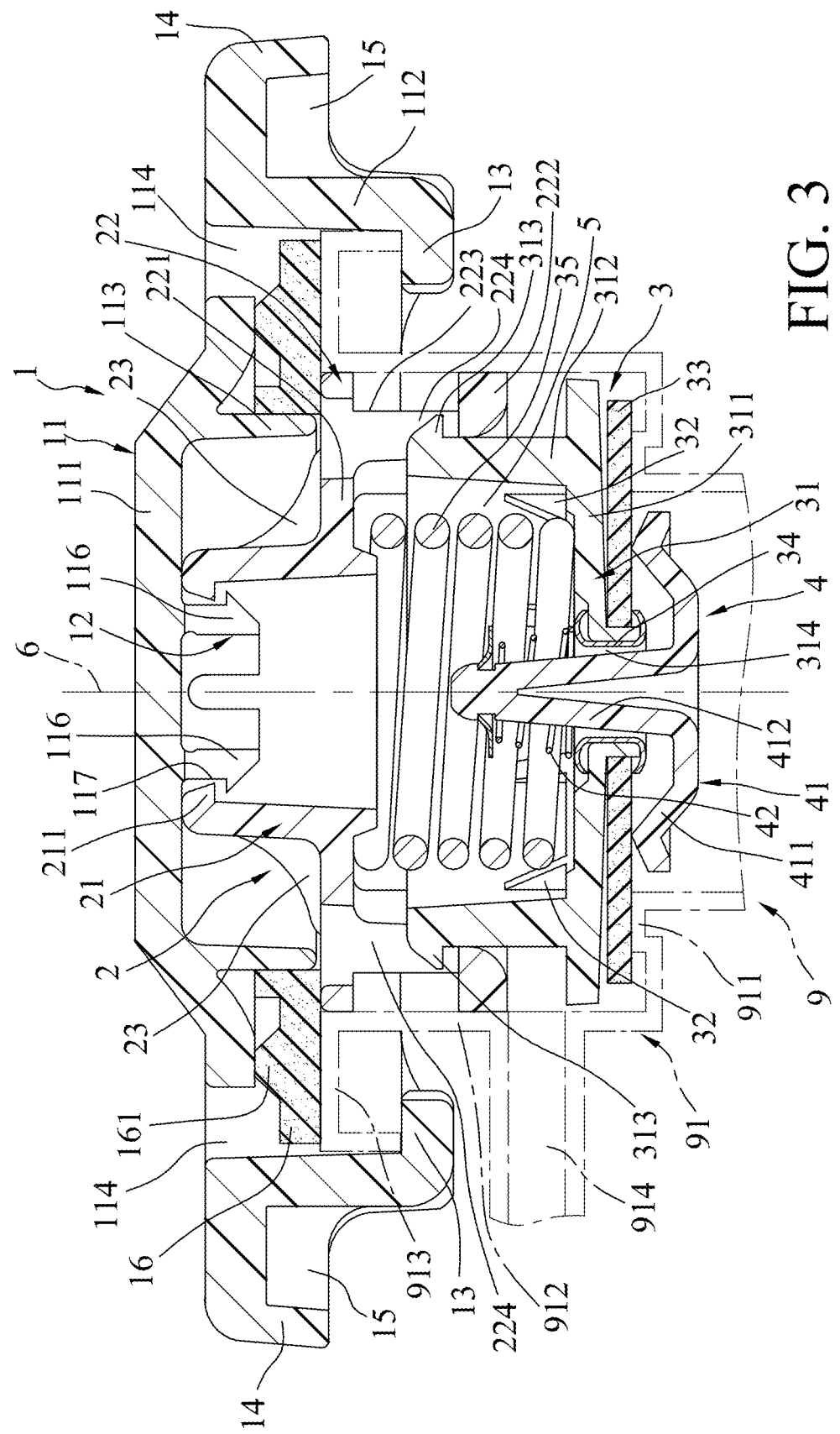
FIG. 3 is a fragmentary schematic sectional view of the embodiment.

Referring to FIGS. 1 to 3, an embodiment of a radiator cap according to the disclosure is adapted for being mounted to a main radiator 9 of an automobile (not shown). A top of the main radiator 9 is formed with a radiator opening 91. The radiator opening 91 has a lower mouth portion 911, an annular wall portion 912, an upper mouth portion 913, and a branch portion 914. The lower mouth portion 911 is annular. The annular wall portion 912 extends upwardly from a periphery of the lower mouth portion 911. The upper mouth portion 913 surrounds and extends outwardly from a top of the annular wall portion 912. The branch portion 914 extends from a side of the annular wall portion 912 and is in fluid communication with an auxiliary radiator (not shown). The upper mouth portion 913 has two opposite gaps (not shown).

The radiator cap of the disclosure has an axis 6. In this embodiment, the radiator cap is mounted to the radiator opening 91, and includes a top cover unit 1, an intermediate seat unit 2, an output valve unit 3, and an input valve unit 4.

The top cover unit 1 includes a cover body 11, a stem 12, two positioning members 13, and a washer 16. The cover body 11 is adapted to rotatably cover the upper mouth portion 913 of the radiator opening 91. The stem 12 extends downwardly from the cover body 11 along the axis 6. The positioning members 13 are disposed respectively at opposite sides of the axis 6, protrude inwardly from a periphery of the cover body 11 toward the axis 6, and are adapted to be fastened to the radiator opening 91. The washer 16 is disposed in the cover body 11 and surrounds the stem 12.

In this embodiment, the cover body 11 of the top cover unit 1 has a cover part 111, a cover surrounding part 112, a partitioning part 113, and two through holes 114. The cover part 111 has a bottom surface from which the stem 12 extends. The cover surrounding part 112 extends downwardly from an outer periphery of the cover part 111 and has a bottom end connected to the positioning members 13. The cover surrounding part 112 of the cover body 11 has two widened portions 115 that protrude from the bottom end of the cover surrounding part 112 in a bent manner toward the axis 6 and that are respectively connected to the positioning members 13. The widened portions 115 may enhance structural strength to prevent the positioning members 13 from breaking. The partitioning part 113 extends downwardly from the bottom surface of the cover part 111, surrounds the stem 12, and is surrounded by the cover surrounding part 112. The through holes 114 extend through the cover part 111 and are respectively situated over the positioning members 13. The through holes 114 is designed to facilitate removal from a mold.

The stem 12 of the top cover unit 1 has a plurality of protruding portions 116 and a surrounding recess 117. The protruding portions 116 are equiangularly spaced apart from each other with respect to the axis 6. The surrounding recess 117 surrounds the axis 6 and is indented from outer peripheries of the protruding portions 116.

The top cover unit 1 further includes a plurality of lugs 14 that are equiangularly spaced apart from each other with respect to the axis 6 and that extend outwardly from the cover surrounding part 112. The lugs 14 are configured to facilitate manual operation of the radiator cap of the disclosure. Specifically, two of the lugs 14 are disposed respectively adjacent to the positioning members 13, and the top cover unit 1 further includes a plurality of reinforcing ribs 15 disposed in the two of the lugs 14. The reinforcing ribs 15 are connected to the two of the lugs 14 and are connected to the cover surrounding part 112 to enhance structural strength.

The washer 16 is disposed between the cover surrounding part 112 and the partitioning part 113, and is pressed between the cover part 111 and the upper mouth portion 913 of the radiator opening 91, thereby sealing the radiator opening 91 and preventing leakage of liquids (not shown). The washer 16 has a ridge portion 161 extending upwardly and surrounding the axis 6. The ridge portion 161 may be resilient to increase a fit. In this embodiment, the ridge portion 161 has a triangular cross-section, and abuts against the cover part 111 of the cover body 11. However, the cross-sectional shape of the ridge portion 161 is not limited hereto. For example, the cross-sectional shape of the ridge portion 161 may be arcuate.

The intermediate seat unit 2 is disposed under and connected to the top cover unit 1, and includes a connecting tube 21, a connecting seat 22, and a plurality of outer reinforcing members 23.

The connecting tube 21 is coupled to the stem 12 and extends along the axis 6. The connecting tube 21 has a flange portion 211 that surrounds the axis 6 and that is rotatably engaged with the surrounding recess 117.

The connecting seat 22 is connected to a lower end of the connecting tube 21 and surrounds the axis 6. The connecting seat 22 has an upper ring portion 221, a lower ring portion 222, a surrounding wall portion 223, and a plurality of guiding recesses 224. The upper ring portion 221 extends outwardly from the lower end of the connecting tube 21 relative to the axis 6. The lower ring portion 222 is spaced apart from and disposed under the upper ring portion 221. The surrounding wall portion 223 interconnects the upper ring portion 221 and the lower ring portion 222, and surrounds the axis 6. The guiding recesses 224 are equiangularly spaced apart from each other with respect to the axis 6. Each of the guiding recesses 224 is indented from an inner surface of the surrounding wall portion 223, and extends upwardly through the upper ring portion 221 and extends outwardly through the surrounding wall portion 223. The lower ring portion 222 has a plurality of indented segments indented from an inner surface thereof. The indented segments of the lower ring portion 222 are respectively in communication with the guiding recesses 224.

The outer reinforcing members 23 are connected between an outer periphery of the connecting tube 21 and a top surface of the upper ring portion 221 of the connecting seat 22 to enhance structural strength.

The output valve unit 3 is connected to a lower part of the intermediate seat unit 2, and includes a valve seat 31, a plurality of inner reinforcing members 32, a valve disc 33, a fastening ring 34, and a first spring 35.

The valve seat 31 is connected to a lower part of the connecting seat 22 and is movable along the axis 6 relative to the connecting seat 22. The valve seat 31 and the connecting seat 22 cooperatively define an inner space 5. In this embodiment, the valve seat 31 has a bottom wall portion 311, an insertion wall portion 312, and a plurality of hook portions 313. The bottom wall portion 311 is formed with a valve hole 314 that is in fluid communication with the inner space 5. The insertion wall portion 312 surrounds the axis 6, extends upwardly from the bottom wall portion 311, and is inserted into the lower ring portion 222 of the connecting seat 22. The hook portions 313 are equiangularly spaced apart from each other, protrude outwardly from an outer periphery of the insertion wall portion 312, and are respectively engaged with and movable along the guiding recesses 224.

The inner reinforcing members 32 are connected between a top surface of the bottom wall portion 311 and an inner periphery of the insertion wall portion 312 for reinforcement of structural strength.

The valve disc 33 is disposed under the bottom wall portion 311 of the valve seat 31 so as to close the lower mouth portion 911 of the radiator opening 91, thereby preventing liquids from flowing through the lower mount portion 911.

The fastening ring 34 fastens the valve seat 31 and the valve disc 33 together.

The first spring 35 is disposed within the inner space 5 for resiliently biasing the valve seat 31 away from the top cover unit 1. In this embodiment, the first spring 35 is connected between the connecting seat 22 and the valve seat 31.

The input valve unit 4 is connected to the output valve unit 3, is movable along the axis 6 relative to the output valve unit 3, and includes a pin rod 41 and a second spring 42.

The pin rod 41 extends movably into the inner space 5 via the valve hole 314 so as to control liquids flowing through the valve hole 314. The pin rod 41 has a valve plate portion 411 and a plug portion 412. The valve plate portion 411 serves as a bottom portion of the pin rod 41. A periphery of the valve plate portion 411 extends upwardly and bends outwardly relative to the axis 6 to abut against a bottom end of the valve disc 33. The plug portion 412 extends upwardly from the valve plate portion 411 into the inner space 5 via the valve hole 314.

The second spring 42 is mounted between the valve seat 31 and a top portion of the pin rod 41, and is disposed for resiliently biasing the valve plate portion 411 to thereby abut against the valve disc 33 so as to close the valve hole 314.

In this embodiment, the cover body 11, the stem 12, the positioning members 13, the lugs 14, and the reinforcing ribs 15 of the top cover unit 1 are integrally made of a plastic material. The outer reinforcing members 23, the connecting seat 22, and the connecting tube 21 of the intermediate seat unit 2 are integrally made of a plastic material. The valve seat 31 and the inner reinforcing members 32 of the output valve unit 3 are integrally made of a plastic material. The pin rod 41 of the input valve unit 4 is integrally made of a plastic material. As a result, manufacturing and assembly of the radiator cap of the disclosure are convenient and easy. By virtue of the aforesaid components being integrally made of a plastic material, a weight and a manufacturing cost of the radiator cap may be reduced. In addition, because there is no need for processing on metal surfaces, environmental pollution may be reduced.

When the radiator cap of the disclosure is mounted to the radiator opening 91, the input valve unit 4, the output valve unit 3, and the intermediate seat unit 2 are inserted into the radiator opening 91 along the axis 6. After the positioning members 13 of the top cover unit 1 are moved past the gaps (not shown) of the upper mouth portion 913, the cover body 11 is rotated such that the positioning members 13 are fastened to the upper mouth portion 913. Because the washer 16 is pressed against top of the upper mouth portion 913, and because the valve disc 33 is pressed against top of the lower mount portion 911, the radiator cap tightly closes the radiator opening 91.

Figure 4:
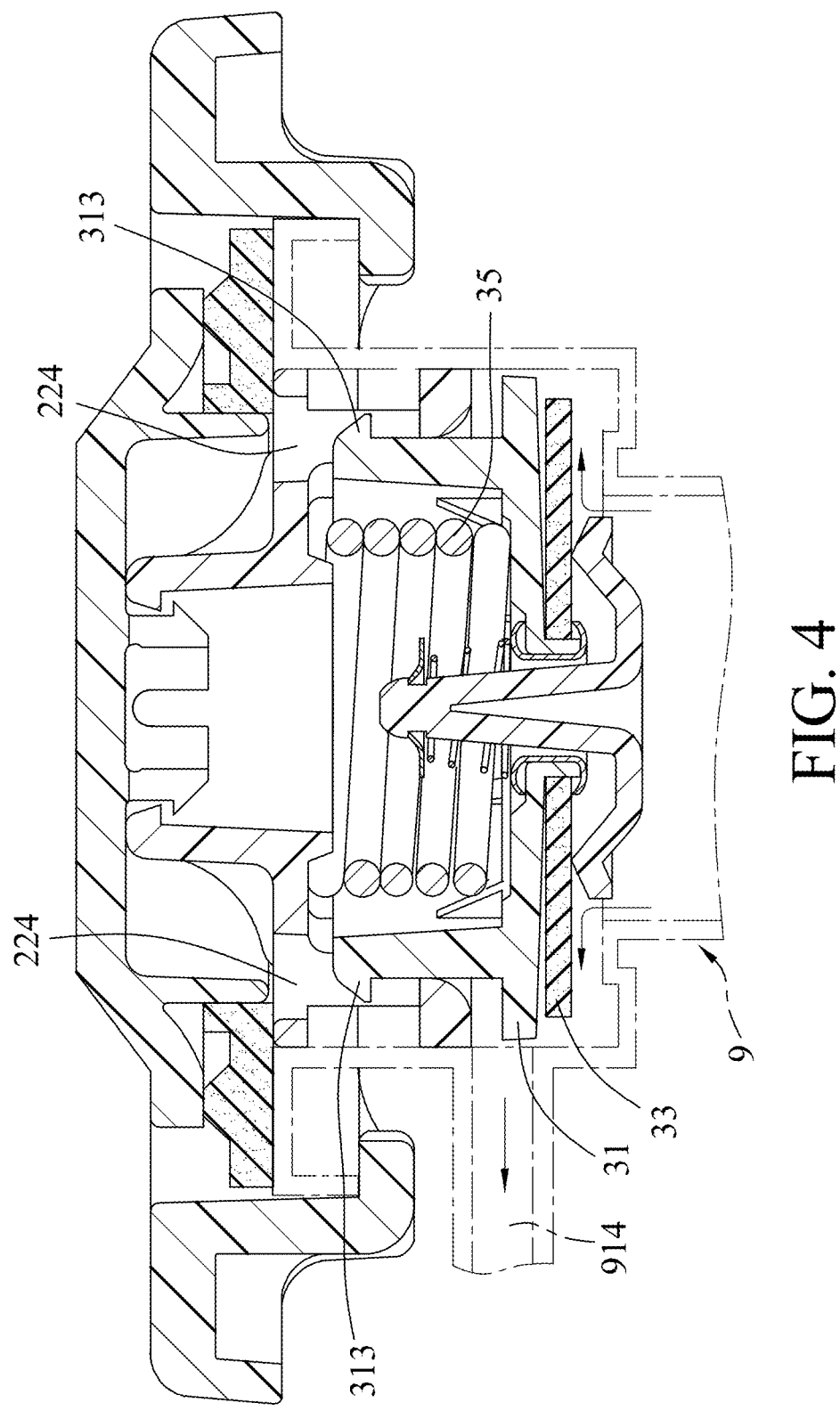
FIG. 4 is a view similar to FIG. 3, but illustrates a valve seat of the radiator cap in an upwardly pushed state.

Referring to FIG. 4, in use, when temperatures of liquids in the main radiator 9 are raised, the liquids are pressurized to push the valve disc 33 upwardly toward the top cover unit

1, and flow into the auxiliary radiator (not shown) via the branch portion 914. Meanwhile, by virtue of the hook portions 313 being respectively engaged with and movable along the guiding recesses 224, the valve seat 31 is driven by movement of the valve disc 33 to move stably toward the top cover unit 1, and the first spring 35 is driven by movement of the valve seat 31 to generate a spring force. As shown in FIG. 3, when the liquids are depressurized, the spring force of the first spring 35 restores the valve seat 31 and the valve disc 33 away from the top cover unit 1.

Figure 5:
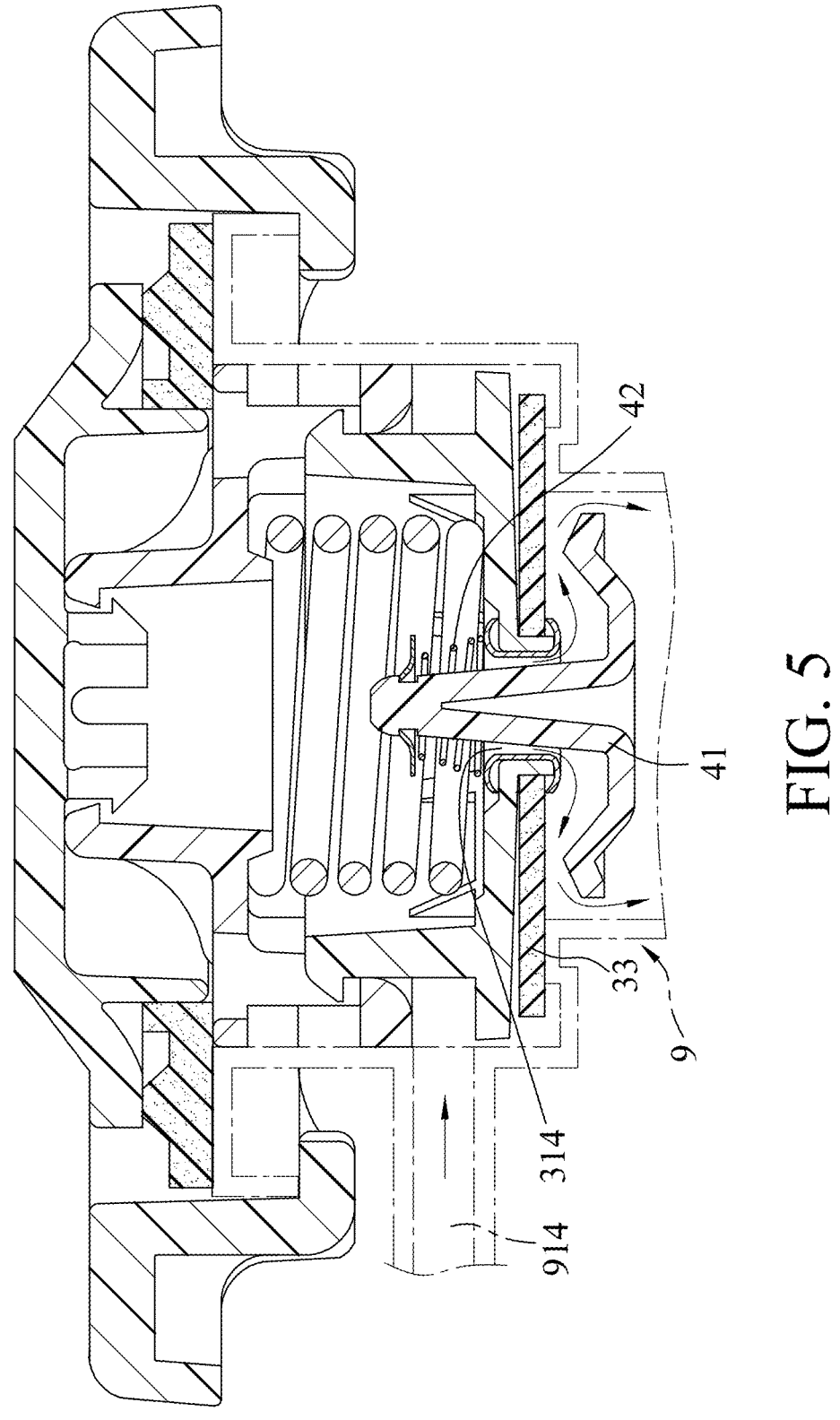
FIG. 5 is a view similar to FIG. 3, but illustrates a pin rod of the radiator cap in a downwardly pulled state.

Referring to FIG. 5, when a negative pressure is formed in the main radiator 9, the pin rod 41 is attracted by the negative pressure to move downwardly away from the valve disc 33, such that the liquids in the auxiliary radiator (not shown) flow to the main radiator 9 via the branch portion 914 and the valve hole 314, and the second spring 42 is driven by movement of the pin rod 41 to generate a spring force. As shown in FIG. 3, when pressures are balanced, the spring force of the second spring 42 restores the pin rod 41 in abutment against the valve disc 33.

In summary, by virtue of the hook portions 313 of the valve seat 31 being respectively engaged with and movable along the guiding recesses 224 of the connecting seat 22, movement of the valve seat 31 relative to the connecting seat 22 is stable and smooth such that the radiator cap of the disclosure may effectively close the radiator opening 91.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A radiator cap adapted to be mounted to a radiator opening and having an axis, said radiator cap comprising:
    a top cover unit including
        a cover body that is adapted to rotatably cover the radiator opening,

a stem that extends downwardly from said cover body along the axis, two positioning members that are disposed respectively at opposite sides of the axis, that protrude inwardly from a periphery of said cover body toward the axis, and that are adapted to be fastened to the radiator opening, and a washer that is disposed in said cover body and that surrounds said stem;

an intermediate seat unit disposed under and connected to said top cover unit, and including a connecting tube that is coupled to said stem and that extends along the axis, and a connecting seat that is connected to a lower end of said connecting tube, that surrounds the axis, and that has a plurality of guiding recesses equiangularly spaced apart from each other with respect to the axis;

an output valve unit connected to a lower part of said intermediate seat unit, and including a valve seat that is connected to a lower part of said connecting seat and that is movable along the axis relative to said connecting seat, said valve seat and said connecting seat cooperatively defining an inner space, said valve seat having a plurality of hook portions that are respectively engaged with and movable along said guiding recesses, and a valve hole that is formed in a lower portion of said valve seat and that is in fluid communication with said inner space, a valve disc that is disposed under and connected to said valve seat, and a first spring that is disposed within said inner space for resiliently biasing said valve seat away from said top cover unit; and an input valve unit connected to said output valve unit, movable along the axis relative to said output valve unit, and including a pin rod that extends movably into said inner space via said valve hole, and a second spring that is mounted between said valve seat and a top portion of said pin rod, and that is disposed for resiliently biasing a bottom portion of said pin rod to thereby abut against said valve disc so as to close said valve hole;

wherein said cover body, said stem, and said positioning members of said top cover unit are integrally made of a plastic material;

wherein said connecting seat and said connecting tube of said intermediate seat unit are integrally made of a plastic material;

wherein said valve seat of said output valve unit is integrally made of a plastic material;

wherein said pin rod of said input valve unit is integrally made of a plastic material;

wherein said connecting seat further has an upper ring portion that extends outwardly from said connecting tube, a lower ring portion that is spaced apart from and disposed under said upper ring portion, and a surrounding wall portion that interconnects said upper ring portion and said lower ring portion and that surrounds the axis;

wherein each of said guiding recesses is indented from an inner surface of said surrounding wall portion, and extends upwardly through said upper ring portion and extends outwardly through said surrounding wall portion;

wherein said valve seat of said output valve unit further has a bottom wall portion that is formed with said valve hole, and an insertion wall portion that surrounds the axis, that extends upwardly from said bottom wall portion, and that is inserted into said lower ring portion of said connecting seat; and wherein said hook portions protrude outwardly from an outer periphery of said insertion wall portion.

2. The radiator cap as claimed in claim 1, wherein:

said intermediate seat unit further includes a plurality of outer reinforcing members that are connected between an outer periphery of said connecting tube and a top surface of said upper ring portion; and said output valve unit further incudes a plurality of inner reinforcing members that are connected between a top surface of said bottom wall portion and an inner periphery of said insertion wall portion.

3. The radiator cap as claimed in claim 1, wherein:

said stem of said top cover unit has a plurality of protruding portions that are equiangularly spaced apart from each other with respect to the axis, and a surrounding recess that surrounds the axis and that is indented from outer peripheries of said protruding portions; and said connecting tube of said intermediate seat unit has a flange portion that surrounds the axis and that is rotatably engaged with said surrounding recess.

4. The radiator cap as claimed in claim 1, wherein said cover body of said top cover unit has:

a cover part that has a bottom surface from which said stem extends;

a cover surrounding part that extends downwardly from an outer periphery of said cover part and that has a bottom end connected to said positioning members;

a partitioning part that surrounds said stem and that is surrounded by said cover surrounding part; and two through holes that extend through said cover part and that are respectively situated over said positioning members.

5. The radiator cap as claimed in claim 4, wherein said top cover unit further includes a plurality of lugs that are equiangularly spaced apart from each other with respect to the axis and that extend outwardly from said cover surrounding part.

6. The radiator cap as claimed in claim 5, wherein:

two of said lugs are disposed respectively adjacent to said positioning members; and said top cover unit further includes a plurality of reinforcing ribs disposed in said two of said lugs.

7. The radiator cap as claimed in claim 6, wherein said cover surrounding part of said cover body has two widened portions that protrude from said bottom end of said cover surrounding part and that are respectively connected to said positioning members.

8. The radiator cap as claimed in claim 4, wherein:

said washer is disposed between said cover surrounding part and said partitioning part, and has a ridge portion extending upwardly and surrounding the axis; and said ridge portion has a triangular cross-section, and abuts against said cover part of said cover body.

\* \* \* \* \*